(12) United States Patent
Vlahos et al.

(10) Patent No.: US 6,616,281 B1
(45) Date of Patent: Sep. 9, 2003

(54) VISIBLE-INVISIBLE BACKGROUND PROMPTER

(75) Inventors: Paul Vlahos, Tarzana, CA (US); Petro Vlahos, Redway, CA (US)

(73) Assignee: iMatte, Inc., Chatsworth, CA (US)

( * ) Notice: Subject to any disclaimer, the term of this patent is extended or adjusted under 35 U.S.C. 154(b) by 0 days.

(21) Appl. No.: 10/214,851

(22) Filed: Aug. 7, 2002

(51) Int. Cl.[7] .............................. G06K 9/00; G05G 5/00
(52) U.S. Cl. ..................... 353/28; 348/586; 348/587; 382/162; 382/163
(58) Field of Search ..................... 353/28; 352/162–164, 352/282, 199; 384/584, 586, 587, 590, 592, 598, 599

(56) References Cited

U.S. PATENT DOCUMENTS

| | | | |
|---|---|---|---|
| 5,469,536 A | * 11/1995 | Blank | ..................... 345/594 |
| 6,134,346 A | * 10/2000 | Berman et al. | ............. 382/163 |
| 6,288,703 B1 | * 9/2001 | Berman et al. | ............. 345/600 |
| 6,301,382 B1 | * 10/2001 | Smith et al. | ................ 382/162 |
| 6,496,599 B1 | * 12/2002 | Pettigrew | .................... 382/162 |

* cited by examiner

*Primary Examiner*—Russell Adams
*Assistant Examiner*—Michael Dalakis
(74) *Attorney, Agent, or Firm*—Blakely, Sokoloff, Taylor & Zafman

(57) ABSTRACT

A video signal is generated representative of a background scene, such as a weather map, which provides an outline of all the detail in the map. This outline detail is made visible to a foreground subject by projecting it onto a white screen behind the subject in a selected color such as green. The projector is selectively inhibited so as to prevent the background detail from projecting onto the foreground subject. The white screen and the green detail lines are removed and replaced by the background scene by an image compositing process. Prompts are visible to the foreground subject, but not visible to a home viewing audience.

10 Claims, 3 Drawing Sheets

VISIBLE-INVISIBLE BACKGROUND PROMPTER

BACKGROUND

The weather map one sees on television exists as an image stored in a computer. The image does not appear on a blank, typically blue screen behind the weatherman in studio. Before transmission to the home viewer, the blue screen is electronically removed and replaced by the weather map. The weatherman's view of the weather map is displayed on a monitor just beyond the edge of the blue screen. On this monitor he observes the position of his hand over the map. He moves his hand over the blue screen, so that his hand appears to be pointing to the desired area on the weather map. The home audience wonders why the weatherman looks off-screen rather than at the map that appears to be behind him, and he sometimes points to an area he is not describing. This hand-eye-screen coordination is awkward, non-instinctive, and requires practice.

SUMMARY OF THE INVENTION

In this invention a white screen replaces the blue screen. A video signal is generated representative of the background scene, such as a weather map, which provides an outline of all the detail in the map. For example, in a map of the United States, the borders of the United States and of the individual states would appear, as well as the outline of numbers and other detail. This outline detail is made visible to a foreground subject such as a weatherman by projecting it onto the white screen behind him in a selected color such as green. The projector is selectively inhibited so as to prevent the background detail from projecting onto the foreground subject. The white screen and the green detail lines are removed and replaced by the weather map by an image compositing process. The prompts are visible to the foreground subject, but not visible to the home viewing audience.

Upon looking at the white screen, the foreground subject, such as a weatherman or other presenter of information, sees all of the weather map or other information detail as green outlines. He may point quickly and accurately to any element on the weather map. The home viewer sees the presenter in front of a full color map. This process of providing a presenter with accurate and detailed prompts may be used with any background, not just weather maps.

DETAILED DESCRIPTION OF THE INVENTION

The invention is a method and apparatus which provides prompts to the foreground subject such as a weatherman or other presenter on the screen behind him that can be removed from the view seen by the home audience. The following discussion describes the prompts as colored green, although other colors may be assigned.

Figure 1:
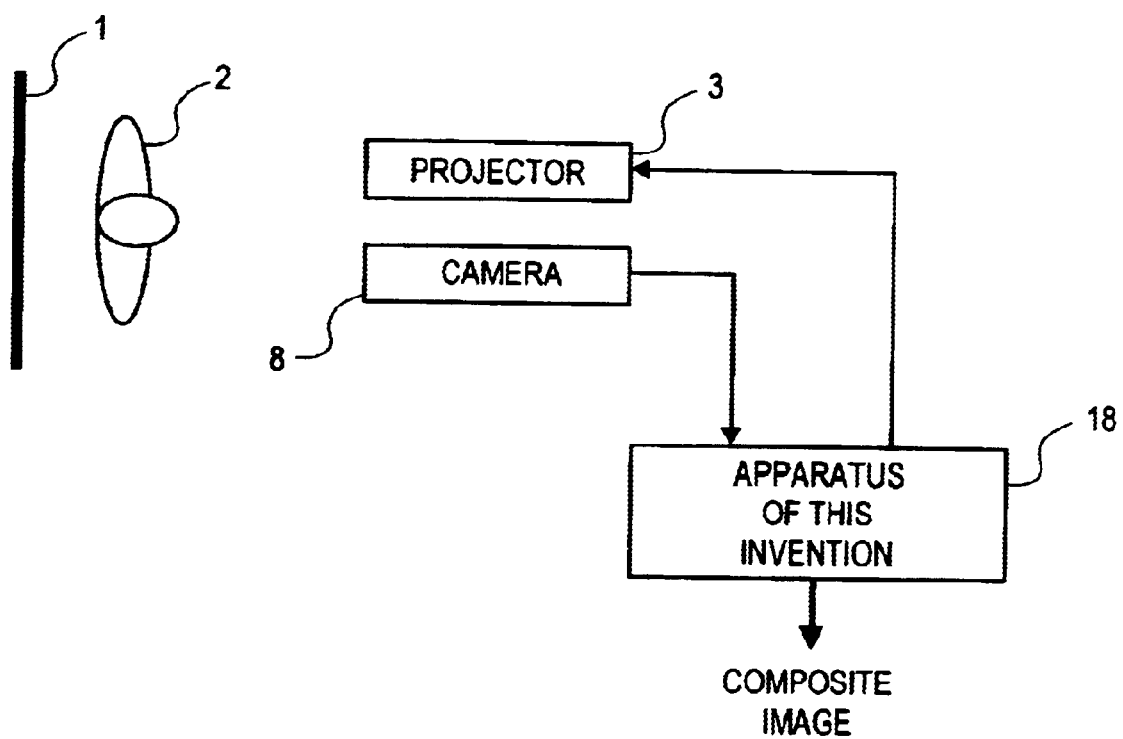
FIG. 1 shows the basic connections of the device of this invention in a studio environment.

FIG. 1 shows the basic connections of the apparatus 18 of this invention which may be implemented in hardware, software executed by a processor or combination of the two. The foreground (FG) image which includes a foreground subject 2 such as a weatherman from the camera 8 is the input to the apparatus 18 of this invention. The image to be projected onto the white screen 1 is provided to the video projector 3. The composite output is provided to the rest of the studio system.

Figure 2:
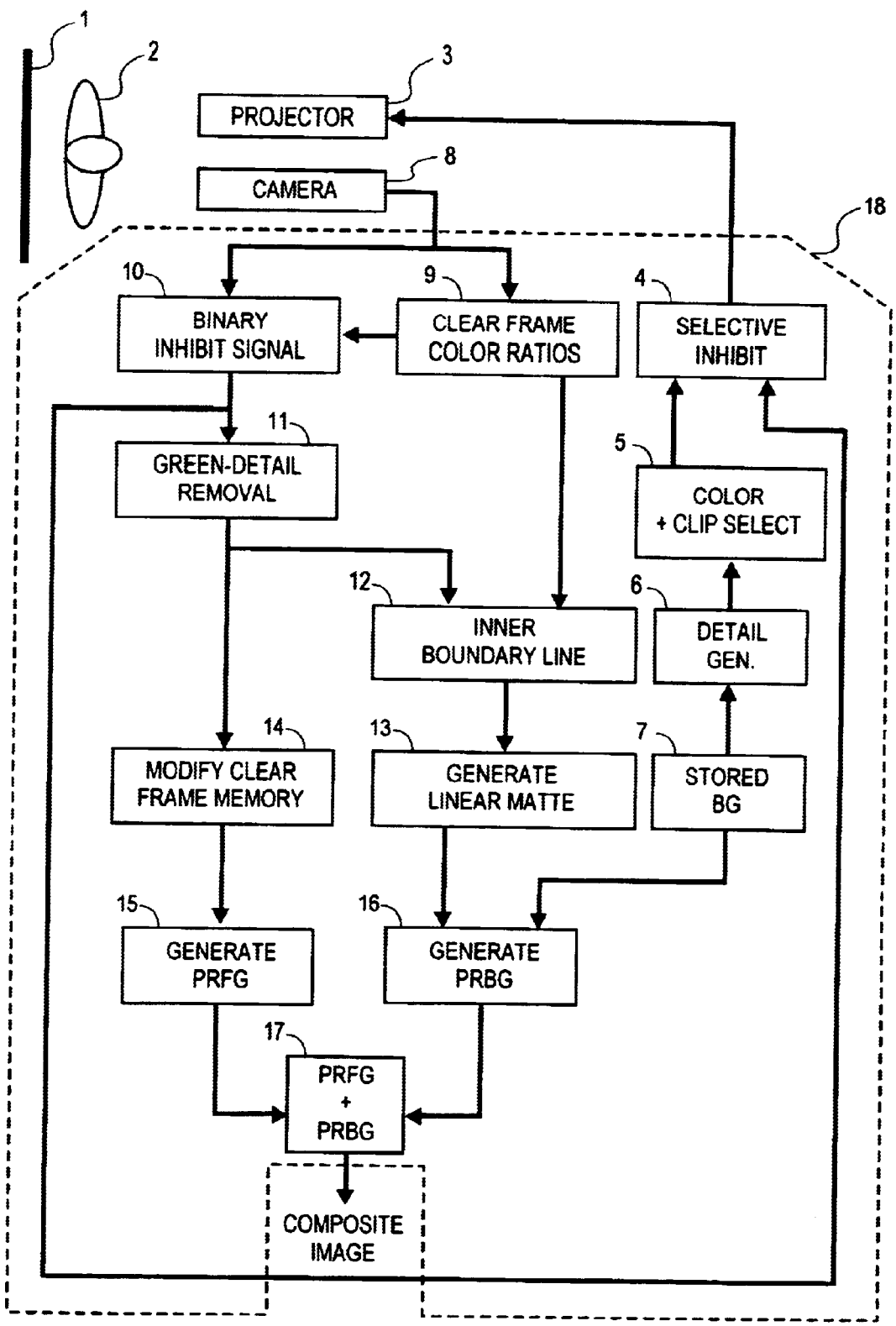
FIG. 2 shows a flow diagram in block form showing all of the steps in this invention.

Referring to FIG. 2, camera 8 observes white screen 1, prior to the arrival of the foreground subject or weatherman 2, and stores a clear frame image of the white screen in memory 9. The white screen is assumed to be non-uniformly illuminated. However, since the screen material is a uniform color (white), the red/blue (R/B) ratio for all pixels on the screen will be a constant, even though it is not uniformly illuminated. With the video camera balanced against a white standard, the R/B ratio will be approximately 1.0 for all areas on the screen. For the same reason, the ratios G/B and G/R will also be constant and approximately 1.0 over the entire screen. The stored RGB levels in clear frame memory 9 are provided to binary matte signal generator 10, which is described in detail below. In this description, RGB levels and reference ratios of the clear frame are shown in UPPER CASE letters, while signals and color ratios of a current image frame are shown in lower case letters.

A background scene, such as a weather map, is stored in memory 7, typically a computer memory. The rgb signals from memory 7 are each independently differentiated in detail signal generator 6 to form three detail signals. This kind of "detail" or "enhancement" signal generation is a common technique used to increase the apparent sharpness of an image. Image enhancement methods, such as the Sobel and Kirsch operators, are standard textbook techniques well known to image processing experts. Any one of these enhancement signal generation methods can be used to generate the detail signal in signal generator 6. Sharp transitions from white to black and for bright colors, produce maximum detail signals, and are assigned an arbitrary value of 1.0. Selecting the larger of the detail signals provides a good detail image signal, typically above 0.5. If the larger of the three detail signals is less than 0.5, then the detail image signal to be projected is the sum of the detail signals.

The selected detail signal from detail signal generator 6 is routed to color and clip select 5 to assign a color (such as green) to the selected detail signal, and also to provide for an initial setting of detail signal level and peak clipping. Color assignment, setting a level, and peak signal clip are self defining and in wide use.

The detail signal from color and clip select 5 is connected to selective inhibitor 4, where the detail image will be inhibited in the subject area by an inhibit signal developed by binary matte signal generator 10.

The addresses at which the detail image is to be inhibited are pixel addresses that include all parts of the foreground subject including the foreground subject-to-background transition area. A moving subject creates an image edge blur. This semitransparent edge blur is the subject-to-background transition area. Pixels on the white screen bordering the transition area constitute an outer boundary line separating the subject from the white screen area.

The Binary Matte Signal

The detail image-prompt projected onto screen 1, and the subject 2, are seen by camera 8 and are routed to binary matte signal generator 10 which operates as follows. For each pixel in the image frame, the ratio r/b obtained from a current frame, is compared with the reference ratio R/B obtained from the clear frame memory 9. If the ratio r/b=reference ratio R/B within a selected threshold (system noise), and if the ratio g/b and g/r are equal to or greater than their reference value, then the selected pixel is in the white screen area (or on a green line in the white screen area) unobstructed by elements of the subject. If the assigned detail signal color is red or blue instead of green, appropriate substitutions for the above-mentioned reference ratios are used. Those pixels in the white screen area are assigned a matte signal level of 1.0. All other pixels are in the opaque subject area or in the subject to background transition area, and are assigned a matte signal level of 0.0. The assignment of 1.0 and 0.0 defines a binary matte signal. The term "alpha signal" is used interchangeably with the term "matte signal," whether binary or linear.

Inhibit Signal

The binary matte signal of signal generator 10 is also the inhibit signal and is connected to selective inhibitor 4 which operates as follows. A projector pixel whose address is assigned a value of 0.0 is inhibited and does not project the green detail signal onto the screen, while addresses assigned a value of 1.0 are not inhibited. Therefore, the green detail, image is projected by electronic projector 3 onto the white screen area but not onto the subject or the subject's transition area.

Removal of Green or Other Color Detail Lines

Having inhibited the detail image from projecting onto the foreground subject or weatherman 2, the subject may then look toward the camera (and projector) without being blinded by the light emanating from projector 3. The subject may also look at the screen 1 and see all of the map detail (in green or other color).

Before the foreground subject is composited over the weather map, the green or other color detail must be removed. If the detail color is green, the tests applied to generate the binary matte signal assure that every pixel in the white screen area has a g/r ratio equal to, or greater than, the G/R reference ratio. This g/r ratio will be greater than the reference ratio only if it contains some element of a green line. The binary matte inhibits the projection of prompt signals except in the white screen area outside the outer boundary line. The process of removing the projected prompts (green lines) is therefore restricted to this same area. None of the ratios in this area can represent a pixel in the subject area. Therefore, every pixel in the white screen area has its green level replaced by r(G/R)=g'. The resulting g' will have the green signal level of the reference white of the white screen, thus eliminating all green detail lines from the white screen area. There are other ways of removing the green detail image, but the above method is preferred because of its simplicity.

While green is the most visible color, one may assign the color blue or red to color the detail signal. In the event a blue color is assigned, every pixel in the white screen area will have a b/r ratio equal to or greater than the B/R ratio. If the b/r ratio is greater than the B/R ratio, the pixel is on a blue detail line. The blue color of this pixel is removed by having its blue signal replaced by b' where b'=r(B/R), causing this blue pixel to return to white.

In the event a red color is assigned, every pixel in the white screen area will have a r/b ratio equal to, or greater than, the R/B ratio. If the r/b ratio is greater than the R/B ratio, the pixel is on a red detail line. The red color of this pixel is removed by having the red signal level of this pixel replaced by r' where r'=b(R/B), causing this red pixel to return to white.

With the colored detail lines removed, this image is provided to linear matte generator 13, and to modified clear frame generator 14.

The above process is independent of the white screen luminance, and therefore the process also eliminates the green lines in shadow areas. The image after processing by green detail removal function 11 contains the subject and a white screen, with no remaining evidence of the green detail image.

The Outer Boundary Line

A rapidly moving foreground subject will cause the subject to blur. This edge blur is the subject-to-background transition area. The subject's blurred edge is semitransparent and the background may be seen through it. A pixel in this transition area contains rgb contributions from both the background and the subject. Those contributions from the white screen background must be removed to prevent edge artifacts, and to retain the edge transparency. The binary matte signal of assigned values of ones and zeros generated by binary inhibit signal generator 10, when looked at as an image, will form a field of white (1.0), with a black hole (0.0) representing the subject and transition area.

Those pixels on the white screen previously assigned a binary matte signal of 1.0, and that are adjacent to subject pixels assigned a matte signal of 0.0, form a boundary line separating the subject from its background. This outer boundary line encloses the outer boundary of the subject's transition area as well as the opaque subject. The outer boundary line, and an inner boundary line described below, are required to determine and remove the contribution of the background to pixels in the transition area.

The Inner Boundary Line

The outer boundary line is shrunk a selected number of pixels to form an inner boundary line by inner boundary line generator 12. The inner boundary line is fully onto the opaque subject and clear of the semitransparent blurred edge of a moving subject. Inner boundary line generator 12 operates by looking at each pixel in the binary matte signal as the center of a nine-pixel matrix. If any of the nine pixels is white (1.0), the center pixel is assigned a 1.0 if not already at 1.0. Each repetition of this process shrinks the boundary line by one additional pixel, until it is small enough to form an inner boundary line.

The number of repetitions of the shrinkage process required to locate an inner boundary line fully onto the opaque subject is a function of the velocity of the subject's motions. The modest motions of subjects such as a newscaster or lecturer result in relatively narrow edge-blurs. An initial examination of the number of pixels across the widest of such edge blurs is made the default setting. The number of repetitions established by this default setting places the inner boundary line at the edge of the opaque subject for the widest blur. Other parts of the subject's edge perimeter may have no blur or much narrower blurs, and the established inner boundary line will therefor fall onto the opaque subject. The exact placement of the inner boundary line is not critical, and may extend well onto the opaque subject. Any placement of the inner boundary line that does not result in edge artifacts is acceptable.

The position of the inner boundary line is not to locate the edge of the opaque subject but rather to identify the rgb color levels near the subject's edge. These rgb levels are required by Equation-1, FIG. 3, to locate point x, which is required to compute the contribution of the white backing to pixels in the transition area.

Shrinking of the outer boundary line to arrive at a position for the inner boundary line is desirable because of its simplicity. It is adequate for news casts and other presentations that do not generate fast subject motions.

Rapid cross-screen motions create wide edge blurs. The inner boundary line should therefore be generated solely as a function of the width of the subject-to-backing transition area, and should follow the actual edge of the opaque subject along its full perimeter. This may be done by using "Automatic Generation of Subject to Background Transition Area Boundary Lines and Subject Shadow", U.S. application Ser. No. 10/008,868, filed Nov. 2, 2001. This process is quite complex but it generates ideal boundary lines closely fitting both edges of the subject-to-backing transition area.

Computing the Background Contribution

The linear matte signal generator 13 has been provided by the camera view of the subject in front of a white screen with the projected green lines removed by green line remover 11, and also provided by the addresses of the outer and inner boundary lines from box 12. These inner and outer boundary lines enclose the subject-to-background transition area.

The color (rgb levels) of each pixel in the transition area will consist of the sum of contributions from both the subject and the background. Their individual contribution can be readily calculated since the rgb levels are known at both the outer and inner boundary lines and at each pixel between these two boundary lines. Those white screen background contributions must be determined and removed to make way for equal contributions provided by the new background, e.g., the weather map.

Figure 3:
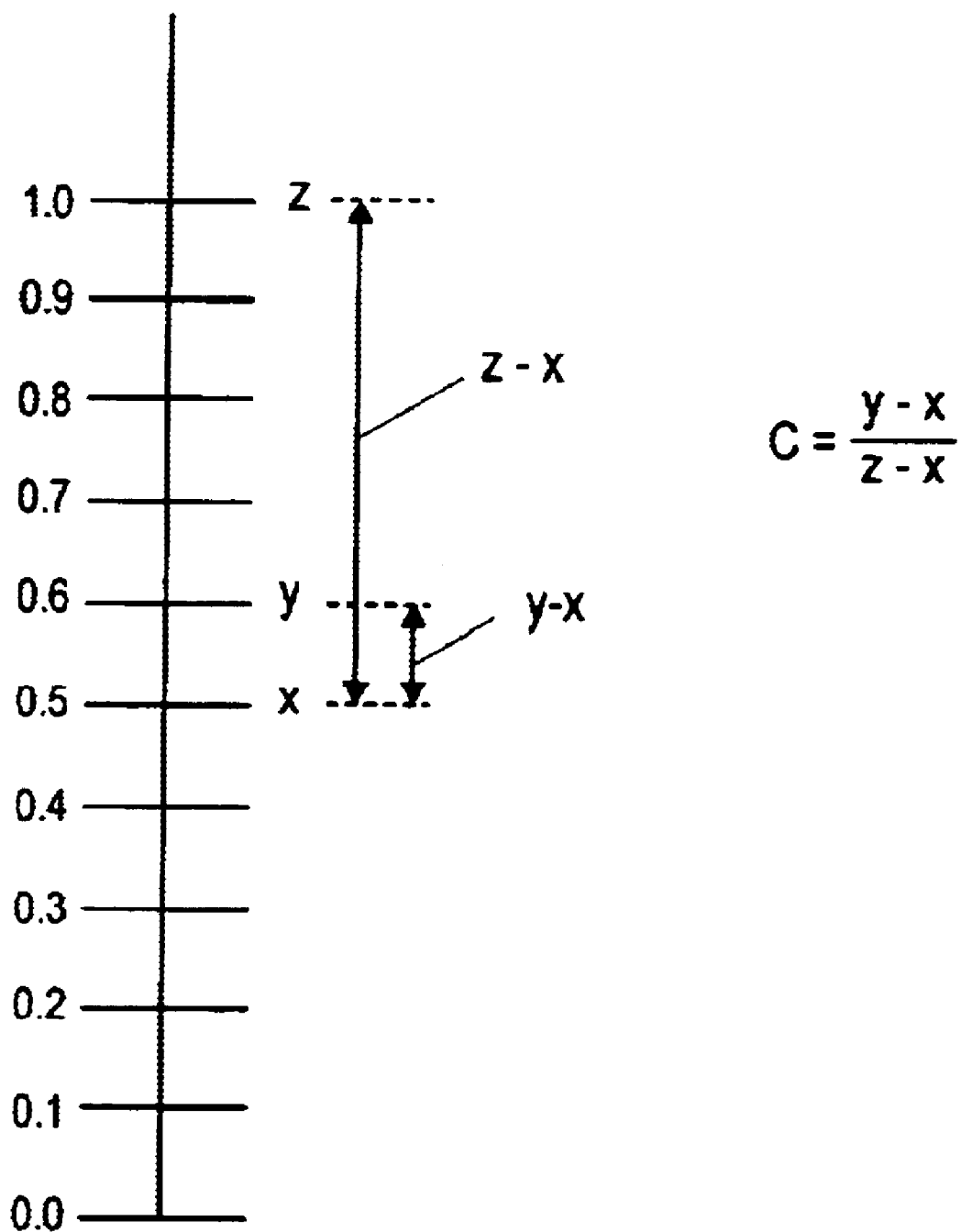
FIG. 3 shows the position of color values on a linear scale used in the computation of background contribution to pixels in a transition area.

The computation of the percent of background signal contribution produced by linear matte signal generator 13 to each pixel in the transition area is explained with the aid of FIG. 3. The rgb levels at a point on the outer boundary line z, and at the nearest point on the inner boundary line x, are compared to find their difference in red, in green, and in blue. Whichever color has the greatest difference is used to compute the contribution of the background to a given pixel in the transition area. A color (assume red) is shown in FIG. 3 as 0.5 units of red signal at the inner boundary line x, and 1.0 unit of red signal for the outer boundary line z. A selected pixel y, between these two boundary lines is seen to have a red signal of 0.6 units, and is therefore close to the inner boundary line x. Being remote from the background at z, it will receive substantially less contribution from the background z than from subject x.

The contribution C of the background z to pixel y is:

$$C=(y-x)/(z-x) \qquad \text{Eq.-1}$$

In this example, C=(0.6−0.5)/(1.0−0.5)=0.1/0.5=0.2, or 20%.

Thus the background pixel z has contributed 20% of its red content to pixel y, as well as 20% of its green and blue content to pixel y. A computation is made to determine the RGB background contribution to each pixel in the transition area. The background contribution varies from 100% at the outer boundary line and linearly diminishes to 0.0% at the inner boundary line. The above process relating to the inner and outer boundary lines and computing the background contribution is used in U.S. Pat. No. 6,134,346 where it is explained in greater detail.

Modified Clear Frame

The contribution of the white screen background to pixels in the transition area has been determined as a percentage of the background signal level. The background consists of the blank white screen if there are no shadows on the screen. Because the subject may cast shadows, the clear frame stored in memory 9 cannot be used as the background unless the shadows are unwanted. Generating a modified clear frame which is stored in memory 14 as follows retains the foreground subject's or weatherman's shadows. In modified clear frame memory 14, pixel levels on the outer boundary line are interpolated and or extrapolated across the subject to the outer boundary line at the opposite side of the subject.

This process eliminates the foreground subject and extends the signal levels on the outer boundary line (including shadow regions) through the transition area to and beyond the inner boundary line. The modified clear frame substitutes for the original clear frame when generating a processed foreground signal, it is desired to preserve the foreground subject's or weatherman's shadows.

The Processed Foreground PRFG

The modified clear frame in memory 14, when multiplied by the matte signal of linear matte signal generator 13, provides the actual RGB levels contributed by the white screen background to each pixel in the current image frame. This contribution is removed from the image frame by subtraction in processed foreground generator 15. The remainder is the subject in full color against a black field, and is defined as the Processed Foreground (PRFG). The generation of the PRFG, together with the matte signal 13 is all that is required in applications where a selected background is inserted later. In the case of a real time broadcast, the compositing is required immediately, and may be done using other equipment. The final step of inserting the new background scene is described below.

The Processed Background PRBG

The new background (stored map) memory 7 is multiplied, in PRBG signal generator 16, by the linear matte signal to form an image of the weather map containing a black hole in the shape of the subject. This image frame is the processed background PRBG signal from generator 16, and is provided to adder 17.

The Composite Image

Summing the processed foreground provided by PRFG signal generator 15 with the processed background provided by PRBG signal generator 16, by simple addition in PRFG+PRBG adder 17, inserts the subject into the black hole that was created for it, thereby generating the composite image of the weatherman against the weather map. The use of the modified clear frame, and a linear matte signal, preserves the subject's shadows that will appear on the weather map in the composite image. The linear matte signal preserves the full transparency of blurred edges due to subject motion. If the weatherman moves his hand rapidly enough to form a blurred edge, one will see details of the weather map through the blur.

Maintaining true edge transparency, the retention of shadows, and providing the weatherman with a detail image that can be pointed to and touched, are major factors in creating the illusion that the composite image is real. It also permits the weatherman to concentrate on the message rather than the position of his or her hand on a blank screen.

Reference Color Update

A large line voltage change may alter the color of the illumination on the white screen, making the reference color ratios from the stored clear frame invalid. The apparatus 18 may include programming, however, to shut off the detail image for a single frame and project a black field. The binary matte signal will have already identified the unobscured white screen area from which new reference color ratios may be generated. This process of shutting off the green detail image and obtaining up-to-date RGB reference colors can be incorporated into the computer for automatic updating at selected intervals. Frequent updating eliminates the effects of color changes from line voltage changes, and from people opening doors, etc.

While the above description used a weather map as an example, the background scene may consist of any information, such as tables, charts and the like.

Projection Screen

The white projection screen may consist of any front projection screen with its illumination provided from the front. Because of the possibility of a very dark shadow under the weatherman's hand when touching the screen, which could be incorrectly identified as part of the subject, two or more light sources should be used to minimize shadow density.

The lighting of the screen may be simplified by using a low-gain translucent white screen partially illuminated from the rear by small multiple diffuse incandescent or fluorescent light sources. Such screens need be no thicker than about an inch or two. Rear illumination of the screen to about one-half to one-third of normal level, limits the darkness of the shadow. This procedure provides a good separation between black areas on the subject, which are quite dark, while the darkest shadows on the screen are limited to a medium gray.

We claim:

1. A method for projecting and then removing visible prompts comprising the steps of:
   a) computing reference RGB color ratios of a white screen,
   b) generating a binary matte signal from said color ratios that identifies areas of said white screen unobstructed by a subject as those pixels in a current image whose color ratios match reference color ratios, and all remaining pixels identify a subject area,
   c) generating a detail signal of a background scene by differentiating its red, green and blue components,
   d) inhibiting said detail signal in said subject area,
   e) projecting said inhibited detail signal onto said white screen,
   f) removing from a camera signal said projected inhibited detail signal by reducing the level of the color of each pixel of said detail signal to a level that results in the pixel's color ratios equaling those of the white screen,
   g) generating a linear matte signal by calculating the percent contribution of the background to the image in a current frame,
   h) removing the contribution of the background scene from a current image frame, by subtracting the product of the linear matte signal and a selected clear frame signal, to create a processed foreground image for use as input to a compositing system.

2. The method of claim 1 in which said color ratios, when using a green colored detail image, are r/b, g/r, and g/b, where r, b and g represent respectively, red, blue and green signal components of a current image frame.

3. The method of claim 1 in which said detail signal is generated by selecting the larger of the separate r g b detail signals if one of said detail signals is greater than 0.5, or the sum of r g b detail signals if none are greater than 0.5, as the detail signal selected for projection.

4. The method of claim 1 in which said detail signal is assigned one of the colors green, blue or red.

5. The method of claim 1 in which said projector is an electronic projector.

6. The method of claim 1 in which said projected inhibited detail signal is assigned a green color and is removed by assigning each pixel in the white screen area, unobscured by elements of the foreground subject, a signal level of g' where g'=r(G/R), where r represents a red signal component of a current image frame, R represents a red signal component of a white screen image frame and G represents a green signal component of said white screen image frame.

7. The method of claim 1 in which said linear matte signal is the percent contribution of the background scene to each pixel in the image frame, and is computed for the transition area by the equation C=(y−x)/(z−x) where x is the rgb levels of a pixel on the edge of the opaque subject; where y is the rgb levels of a given pixel in the subject to background transition area; and z is the rgb signal levels of pixels on the white background.

8. The method of claim 1 in which said selected clear frame is one of two clear frames where the first of said two frames is an image of the white screen background with foreground subject removed prior to the storage of the clear white screen frame, and the second clear frame is a current image frame that includes the subject, and where said subject is removed by at least one of interpolation and extrapolation of r g b levels on the white screen adjacent to the subject, across said subject thereby removing the subject but leaving subject shadows if present.

9. The method of claim 1 in which said white screen comprises a translucent white material.

10. The method of claim 9 in which said translucent white material is illuminated from its rear to control shadow density.

* * * * *